United States Patent
Shintani et al.

(10) Patent No.: US 10,417,665 B2
(45) Date of Patent: Sep. 17, 2019

(54) SERVER, NAVIGATION DEVICE, AND DISTRIBUTION EXCLUSION AREA SETTING METHOD IN ADVERTISING INFORMATION DISTRIBUTION SYSTEM

(71) Applicant: HONDA MOTOR CO., LTD., Minato-Ku, Tokyo (JP)

(72) Inventors: Hidekazu Shintani, Wako (JP); Yosuke Fuchiwaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 27 days.

(21) Appl. No.: 15/539,382

(22) PCT Filed: Nov. 11, 2015

(86) PCT No.: PCT/JP2015/081747
§ 371 (c)(1),
(2) Date: Jun. 23, 2017

(87) PCT Pub. No.: WO2016/103950
PCT Pub. Date: Jun. 30, 2016

(65) Prior Publication Data
US 2018/0025385 A1    Jan. 25, 2018

(30) Foreign Application Priority Data

Dec. 25, 2014    (JP) .................. 2014-261705

(51) Int. Cl.
G06Q 30/02        (2012.01)
G09F 19/00        (2006.01)
G01C 21/36        (2006.01)

(52) U.S. Cl.
CPC ..... G06Q 30/0266 (2013.01); G01C 21/3667 (2013.01); G01C 21/3682 (2013.01);
(Continued)

(58) Field of Classification Search
CPC ............... G06Q 30/0266; G06Q 30/02; G06Q 30/0231; G06Q 30/0261; G06Q 30/0265;
(Continued)

(56) References Cited

U.S. PATENT DOCUMENTS

| | | | | |
|---|---|---|---|---|
| 6,138,072 A | * | 10/2000 | Nagai | ................ G01C 21/3679 701/454 |
| 2002/0065604 A1 | * | 5/2002 | Sekiyama | .......... G01C 21/3476 701/426 |

(Continued)

FOREIGN PATENT DOCUMENTS

| | | |
|---|---|---|
| JP | 2005-033464 A | 2/2005 |
| JP | 2009-080337 A | 4/2009 |

(Continued)

OTHER PUBLICATIONS

Office Action dated Sep. 26, 2017 issued over the corresponding Japanese National Phase Application No. 2016-566021 with the English translation of the pertinent portion.
PCT/ISA/210 from PCT/JP2015/081747 with the English translation thereof.

* cited by examiner

*Primary Examiner* — Richard A Goldman
(74) *Attorney, Agent, or Firm* — Carrier Blackman & Associates, P.C.; Joseph P. Carrier; William D. Blackman

(57) ABSTRACT

The purpose of the present invention is to provide a server, navigation device, and distribution exclusion area setting method in an advertising information distribution system, which avoid unnecessary distribution of advertising information and improve precision of a distribution area of the advertising information. When distributing advertising information relating to a facility in the vicinity of the present location of the navigation device, at least a portion of the area of a travel area which has recently been traversed is excluded from an area for distribution of the advertising information; therefore, it becomes unnecessary to distribute the advertising information of the facility which is in a site (Continued)

to which it would be necessary to double back from the present location, and it is possible to improve the precision of the distribution area of the advertising information.

9 Claims, 9 Drawing Sheets

(52) U.S. Cl.
CPC ......... *G01C 21/3697* (2013.01); *G06Q 30/02* (2013.01); *G06Q 30/0261* (2013.01); *G09F 19/00* (2013.01)

(58) Field of Classification Search
CPC ........... G06Q 30/0251; G06Q 30/0252; G01C 21/3667; G01C 21/3682; G01C 21/3697; G01C 21/3679; G09F 19/00
USPC ........... 701/430, 426, 425; 705/14.53, 14.57, 705/14.58, 14.62, 14.68
See application file for complete search history.

(56) References Cited

U.S. PATENT DOCUMENTS

| | | | |
|---|---|---|---|
| 2008/0027634 A1* | 1/2008 | Obradovich | G01C 21/3461 701/423 |
| 2008/0214148 A1* | 9/2008 | Ramer | G06Q 30/02 455/414.1 |
| 2008/0214156 A1* | 9/2008 | Ramer | G06Q 30/00 455/414.1 |
| 2012/0054028 A1* | 3/2012 | Tengler | G01C 21/3697 705/14.49 |
| 2012/0239498 A1* | 9/2012 | Ramer | H04H 60/46 705/14.53 |
| 2013/0053005 A1* | 2/2013 | Ramer | H04W 4/025 455/414.1 |
| 2018/0025385 A1* | 1/2018 | Shintani | G09F 19/00 701/430 |

FOREIGN PATENT DOCUMENTS

| | | |
|---|---|---|
| JP | 2014-066803 A | 4/2014 |
| JP | 2014-086009 A | 5/2014 |

SERVER, NAVIGATION DEVICE, AND DISTRIBUTION EXCLUSION AREA SETTING METHOD IN ADVERTISING INFORMATION DISTRIBUTION SYSTEM

TECHNICAL FIELD

The present invention relates to a server, a navigation device, and a method of setting a distribution exclusion area in an advertisement information distribution system, which is suitable for being applied to an advertisement information distribution system that distributes advertisement information to which position information has been added from a server to a navigation device in a vehicle.

The advertisement information to which position information has been added primarily refers to facility information, which is made up of digital content linked with position information, or so-called POI (Point Of Interest) information or the like.

BACKGROUND ART

As one such type of advertisement information distribution system, Japanese Laid-Open Patent Publication No. 2005-033464 (hereinafter referred to as JP 2005-033464A) discloses that, when current position information is transmitted from a vehicle incorporated terminal to a server, the server selects the advertisement information based on received current position information and identification information of the vehicle incorporated terminal, and transmits the advertisement information to the vehicle incorporated terminal (see paragraph [0060] of JP 2005-033464A).

In this case, it is disclosed that the server embeds the selected advertisement information within the map information and transmits the advertisement information to the vehicle incorporated terminal. Further, in the vehicle incorporated terminal, in the case that the vehicle comes into proximity to a business location that is the object of an advertisement, the advertisement information is output to the navigation device (see paragraph [0065] of JP 2005-033464A).

Japanese Laid-Open Patent Publication No. 2009-080337 (hereinafter referred to as JP 2009-080337A) discloses that, in an advertisement information distribution system, advertisement information, which is selected by a distribution device, is transmitted from the distribution device (server) to a vehicle incorporated device, based on user setting information received from the vehicle incorporated device and route information to a destination point (see abstract of JP 2009-080337A). It is further disclosed that, in the vehicle incorporated device which has received the advertisement information, the advertisement information is displayed on a display unit by way of an icon within a planned route on a map from a current location to the destination point (see paragraph [0082] and FIG. 8 of JP 2009-080337A).

SUMMARY OF INVENTION

As disclosed in JP 2009-080337A, in the case that a planned route for the vehicle is known beforehand, it is possible to deliver accurate advertisement information from the server at a precise position with respect to a location where the vehicle is headed from its current position. However, in the case that the planned route is unknown, a problem results in that it is difficult to predict the location where the vehicle is headed.

According to JP 2005-033464A, in the case that advertisement information of shops or the like in the vicinity of a mobile terminal is to be distributed according to identification information of the mobile terminal, advertisement information of shops or the like located in front of the mobile terminal in the travel direction is distributed. However, due to the fact that the travel direction changes quickly, it is difficult to predict the travel direction at times that a planned route is undetermined, and there is a concern that there will frequently be failures with results that differ from the aim of such distribution.

For example, as shown in the comparative example of FIG. 9A, a case is considered in which, within a map 2 which is displayed on a display unit 1 of a vehicle navigation device, with respect to a vehicle 3 that is oriented in a northward direction at a certain point in time, advertisement information 5a, 5b, 5c distributed from a server is displayed within a fixed distribution area 4 indicated by a fan shape in the direction of travel of the vehicle 3.

In this case, as shown in FIG. 9B of the comparative example, if the travel direction changes so that the vehicle 3 at a subsequent point in time is heading in an eastward direction, a problem occurs in that the advertisement information 5a, 5b, 5c, which had been displayed up till now in the distribution area 4, becomes erroneous.

In response to this problem, if the distribution area 4 is enlarged in all directions (the entire surrounding vicinity) of the vehicle 3, as shown in a distribution area 4a in FIG. 9C of the comparative example, there is a high possibility that the predictive accuracy of the advertisement information 5a, 5b, 5c will be low.

The present invention has been devised in consideration of the problems mentioned above, and has the object of providing a server, a navigation device, and a method of setting a distribution exclusion area in an advertisement information distribution system, in which it is possible to improve the accuracy of the distribution area for advertisement information by avoiding distribution of unnecessary advertisement information.

A server according to the present invention is characterized by a server configured to distribute advertisement information to a navigation device in a vehicle, comprising a database configured to store the advertisement information, and a distribution unit configured to select the advertisement information from the database and distribute the advertisement information to the navigation device, wherein in a case that the advertisement information, which relates to a facility existing within a distribution area of a predetermined range from a current location of the navigation device, is selected from the database and distributed to the navigation device, the distribution unit is configured to set to a distribution exclusion area to be excluded from the distribution area at least a portion of a travel area in which traveling took place in a period retroactively over a predetermined time period from a current time of the navigation device, or at least a portion of a travel area in which traveling took place in a zone retroactively over a predetermined distance from the current location of the navigation device.

In accordance with the server according to the present invention, in the event that advertisement information relating to facilities existing in the vicinity of the current location of a navigation device being used by a user is distributed, at least a portion of an area of a travel area which has recently been traversed by the user (and the navigation device) is excluded from a distribution target of the advertisement information. Therefore, it becomes unnecessary to distribute advertisement information of facilities in locations where it would be necessary to turn back from the current location, it is possible to improve the accuracy of the distribution area for the advertisement information, and distribution of unnecessary advertisement information can be dispensed with.

In this case, as the at least a portion of the travel area that was set to the distribution exclusion area and in which traveling took place in the period retroactively over the predetermined time period from the current time of the navigation device, the distribution unit may be configured to set in the travel area as a starting point, a first point in which a first predetermined time period is traced back retroactively from the current time, and as an ending point, a second point in which a second predetermined time period is traced back retroactively from a passage time of the first point. Alternatively, as the at least a portion of the travel area that was set to the distribution exclusion area and in which traveling took place in the zone retroactively over the predetermined distance from the current location of the navigation device, the distribution unit may be configured to set in the travel area as a starting point, a third point in which a first predetermined distance is traced back retroactively from the current location, and as an ending point, a fourth point in which a second predetermined distance is traced back retroactively from a passage position of the third point.

In this manner, within the travel area that has recently been traversed, by not excluding distribution to a travel area up to the first point in which the first predetermined time period is traced back retroactively from the current time, or a travel area up to the third point in which the first predetermined distance is traced back retroactively from the current location, useful advertisement information can be delivered with respect to users who might consider turning back if such places are nearby.

In an event it is detected from the navigation device that a destination point for navigation has been set to home, the distribution unit is preferably configured to cancel setting of the distribution exclusion area, and change the setting of the distribution exclusion area to the distribution area.

This is because, if the user is returning home, timely advertisement information can be delivered and displayed in consideration of the user who thinks it might be acceptable to stop by a facility that is transmitting such advertisement information.

Further, in an event it is determined that the vehicle is traveling in a manner that a portion of the travel trajectory thereof within the travel area that was set to the distribution exclusion area overlaps by a predetermined time or a predetermined distance, the distribution unit is preferably configured to cancel setting of the distribution exclusion area of the travel area in which traveling takes place in an overlapping manner, and change the setting of the distribution exclusion area to the distribution area.

By canceling the setting of the distribution exclusion in the case that the vehicle is traveling in such a manner that the travel trajectory thereof overlaps, it is possible to accurately distribute advertisement information relating to facilities in the vicinity of the current location of the navigation device used by the user.

A navigation device according to the present invention is characterized by a navigation device in a vehicle and configured to receive advertisement information from a server, comprising a display unit configured to display a map of a surrounding area including a position of the navigation device, and a display area setting unit which, on a basis of travel trajectory information of a host vehicle, is configured to set a display area for the advertisement information in order to display the advertisement information distributed from the server in a superimposed manner on the map of the display unit, wherein in a case that the display area for the advertisement information, which relates to a facility existing within a predetermined range from a current location of the navigation device, is set from the received advertisement information, the display area setting unit is configured to set to a display exclusion area to be excluded from the display area for the advertisement information at least a portion of a travel area in which traveling took place in a period retroactively over a predetermined time period from a current time of the navigation device, or at least a portion of a travel area in which traveling took place in a zone retroactively over a predetermined distance from the current location of the navigation device.

In accordance with the navigation device according to the present invention, in the event that advertisement information relating to facilities existing in the vicinity of the current location of the navigation device being used by a user is displayed on the map, at least a portion of an area of a travel area which has recently been traversed by the user (and the navigation device) is excluded from a display area for the advertisement information. Therefore, it becomes unnecessary to display advertisement information of facilities in locations where it would be necessary to turn back from the current location, and the display of unnecessary advertisement information can be dispensed with.

In this case, as the at least a portion of the travel area that was set to the display exclusion area of the advertisement information and in which traveling took place in the period retroactively over the predetermined time period from the current time of the navigation device, the display area setting unit may be configured to set in the travel area as a starting point, a first point in which a first predetermined time period is traced back retroactively from the current time, and as an ending point, a second point in which a second predetermined time period is traced back retroactively from a passage time of the first point. Alternatively, as the at least a portion of the travel area that was set to the display exclusion area of the advertisement information and in which traveling took place in the zone retroactively over the predetermined distance from the current location of the navigation device, the display area setting unit may be configured to set in the travel area as a starting point, a third point in which a first predetermined distance is traced back retroactively from the current location, and as an ending point, a fourth point in which a second predetermined distance is traced back retroactively from a passage position of the third point.

In this manner, within the travel area that has recently been traversed, by not excluding from the display area of the advertisement information a travel area up to the first point in which the first predetermined time period is traced back retroactively from the current time, or a travel area up to the third point in which the first predetermined distance is traced back retroactively from the current location, useful advertisement information can be displayed with respect to users who might consider turning back if such places are nearby.

The navigation device preferably further comprises a destination point setting unit configured to set a destination point, wherein, in an event it is detected from the destination point setting unit that the destination point for navigation has been set to home, the display area setting unit is configured to cancel setting of the display exclusion area, and change the setting of the display exclusion area to the display area.

This is because, if the user is returning home, timely advertisement information can be displayed in consideration of a user who thinks it might be acceptable to stop by a facility that is transmitting such advertisement information.

Further, in an event it is determined that the vehicle is traveling in a manner that a portion of the travel trajectory thereof within the travel area that was set in the display exclusion area overlaps by a predetermined time or a predetermined distance, the display area setting unit is preferably configured to cancel setting of the display exclusion area of the travel area in which traveling takes place in an overlapping manner, and set the display exclusion area to the display area.

By canceling the setting of the distribution exclusion in the case that the vehicle is traveling in such a manner that the travel trajectory thereof overlaps, it is possible to accurately display advertisement information relating to facilities in the vicinity of the current location of the navigation device used by the user.

A method of setting a distribution exclusion area in an advertisement information distribution system according to the present invention is characterized by a method of setting a distribution exclusion area in an advertisement information distribution system made up from a navigation device in a vehicle, and a server configured to distribute advertisement information to the navigation device, wherein the server comprises a database configured to store the advertisement information, and a distribution unit configured to select the advertisement information from the database and distribute the advertisement information to the navigation device, the method comprising a reception step in which the server receives a current location of the navigation device, and a distribution step in which the distribution unit selects from the database the advertisement information, which relates to a facility existing within a distribution area of a predetermined range from the current location of the navigation device, and distributes the advertisement information to the navigation device. Further, in the distribution step, there is set to a distribution exclusion area to be excluded from the distribution area at least a portion of a travel area in which traveling took place in a period retroactively over a predetermined time period from a current time of the navigation device, or at least a portion of a travel area in which traveling took place in a zone retroactively over a predetermined distance from the current location of the navigation device.

In accordance with the present invention, in the event that advertisement information relating to facilities existing in the vicinity of the current location of a navigation device being used by a user is distributed, at least a portion of an area of a travel area which has recently been traversed by the user (and the navigation device) is excluded from a distribution target of the advertisement information. Therefore, it becomes unnecessary to distribute advertisement information of facilities in locations where it would be necessary to turn back from the current location, it is possible to improve the accuracy of the distribution area for the advertisement information, and distribution of unnecessary advertisement information can be dispensed with.

In accordance with the present invention, in the event that advertisement information relating to facilities existing in the vicinity of the current location of a navigation device being used by a user is distributed, at least a portion of an area of a travel area which has recently been traversed by the user (and the navigation device) is excluded from a distribution target of the advertisement information. Therefore, it becomes unnecessary to distribute advertisement information of facilities in locations where it would be necessary to turn back from the current location, it is possible to improve the accuracy of the distribution area for the advertisement information, and distribution of unnecessary advertisement information can be dispensed with.

Further, in accordance with the present invention, in the event that advertisement information relating to facilities existing in the vicinity of the current location of the navigation device being used by a user is displayed on a map, at least a portion of an area of a travel area which has recently been traversed by the user (and the navigation device) is excluded from a display area for the advertisement information. Therefore, it becomes unnecessary to display advertisement information of facilities in locations where it would be necessary to turn back from the current location, and the display of unnecessary advertisement information can be dispensed with.

DESCRIPTION OF EMBODIMENTS

Preferred embodiments in relation to a method of setting a distribution exclusion area in an advertisement distribution system according to the present invention, and a server and a navigation device according to the present invention which are utilized for implementations of such a method, will be described in detail below with reference to the accompanying drawings.

Figure 1:
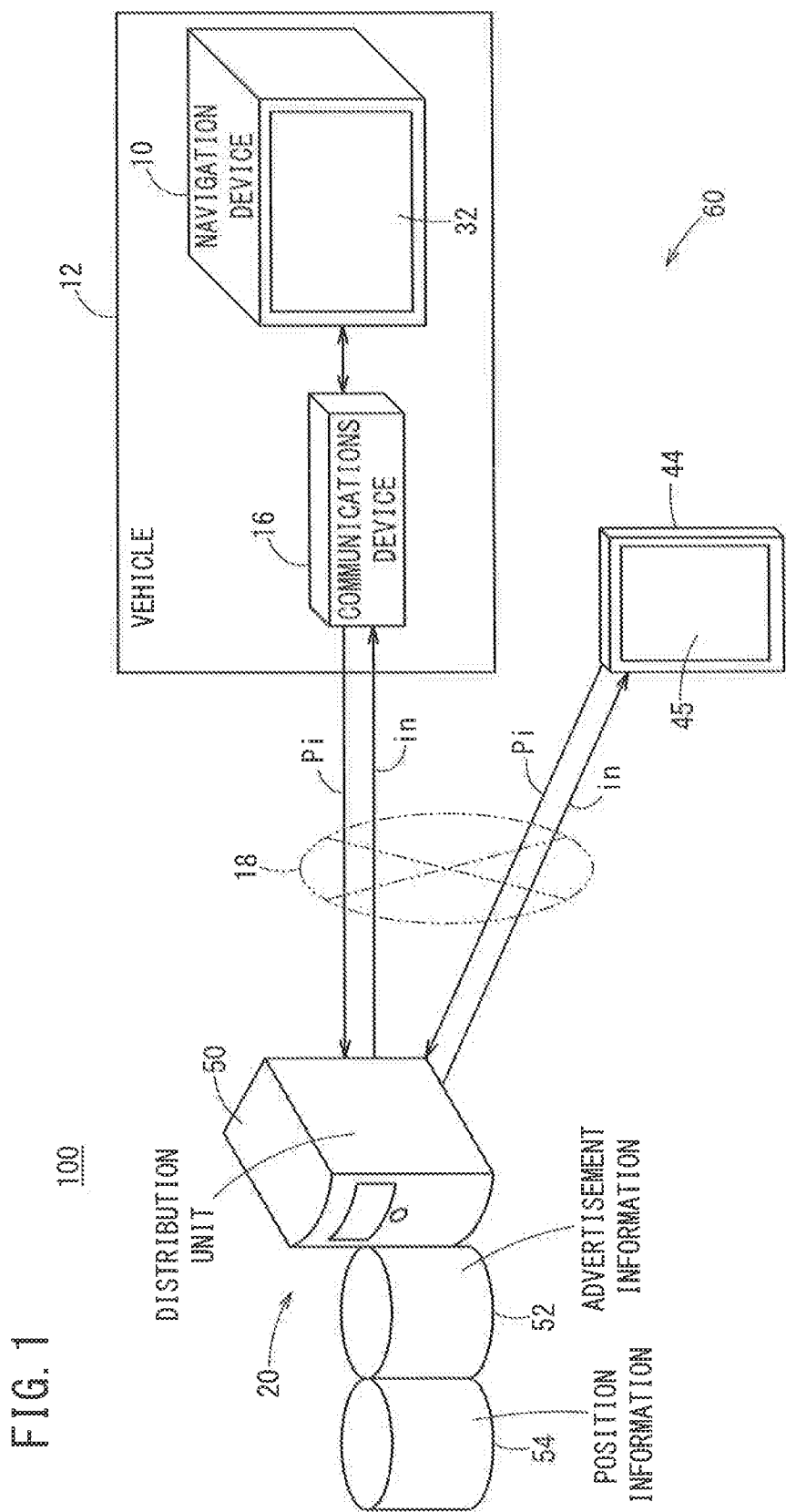
FIG. 1 is an overall configuration diagram as a first example of an advertisement information distribution system made up from a server and a navigation device according to a present embodiment.

FIG. 1 is an overall configuration diagram of an advertisement information distribution system 100 according to a present embodiment.

The advertisement information distribution system 100 is constituted from a server 20, and a client 60, which is connected with respect to the server 20 via a mobile communications network 18 including a base station.

The server 20 includes a distribution unit 50 which is composed of a server main body. An advertisement information database 52, in which position information added advertisement information is accumulated, and a position information storage unit 54, in which position information (current location and historical position information) of the client 60 is stored, are connected with respect to the distribution unit 50.

In the present embodiment, the client 60 is composed of a vehicle 12 (also referred to as a host vehicle), and a mobile terminal 44 such as a smart phone, which is carried by a user such as a pedestrian or the like.

The vehicle 12 is equipped with a navigation device 10, and a communications device 16 connected to the navigation device 10.

In the advertisement information distribution system 100 which is configured in the manner described above, when the client 60 such as the vehicle 12 or the mobile terminal 44, etc., transmits to the server 20 position information Pi of itself (a user) at a node point on a map, for example, the distribution unit 50 of the server 20 stores the position information Pi and the like of the client 60 in the position information storage unit 54, together with searching for advertisement information $i_n$, which is compatible with the position information Pi and the like of the client 60, by referring to the advertisement information database 52 to which position information is added (the position information is position information of an advertisement dispatching shop or the like), and then distributing the extracted advertisement information $i_n$ to the vehicle 12 and/or the mobile terminal 44.

The vehicle 12 and/or the mobile terminal 44 superimposes and displays the advertisement information $i_n$ at a corresponding position on the map which is displayed on display units 32, 45 thereof.

The advertisement information distribution system 100, which is made up from the server 20 and the client 60 (the vehicle 12 and the mobile terminal 44) according to the present embodiment, is configured and operated basically in the manner described above. Next, the detailed configuration and operations of the advertisement information distribution system 100 will be described.

In the following description, in order to avoid complications and to facilitate understanding, it will be assumed that the advertisement information distribution system 100 is composed of the server 20 and the vehicle 12. More specifically, since operations of the advertisement information distribution system 100 including the mobile terminal 44 and the server 20 are similar to operations of the advertisement information distribution system 100 including the vehicle 12 and the server 20, description of the former operations will be omitted.

Figure 2:
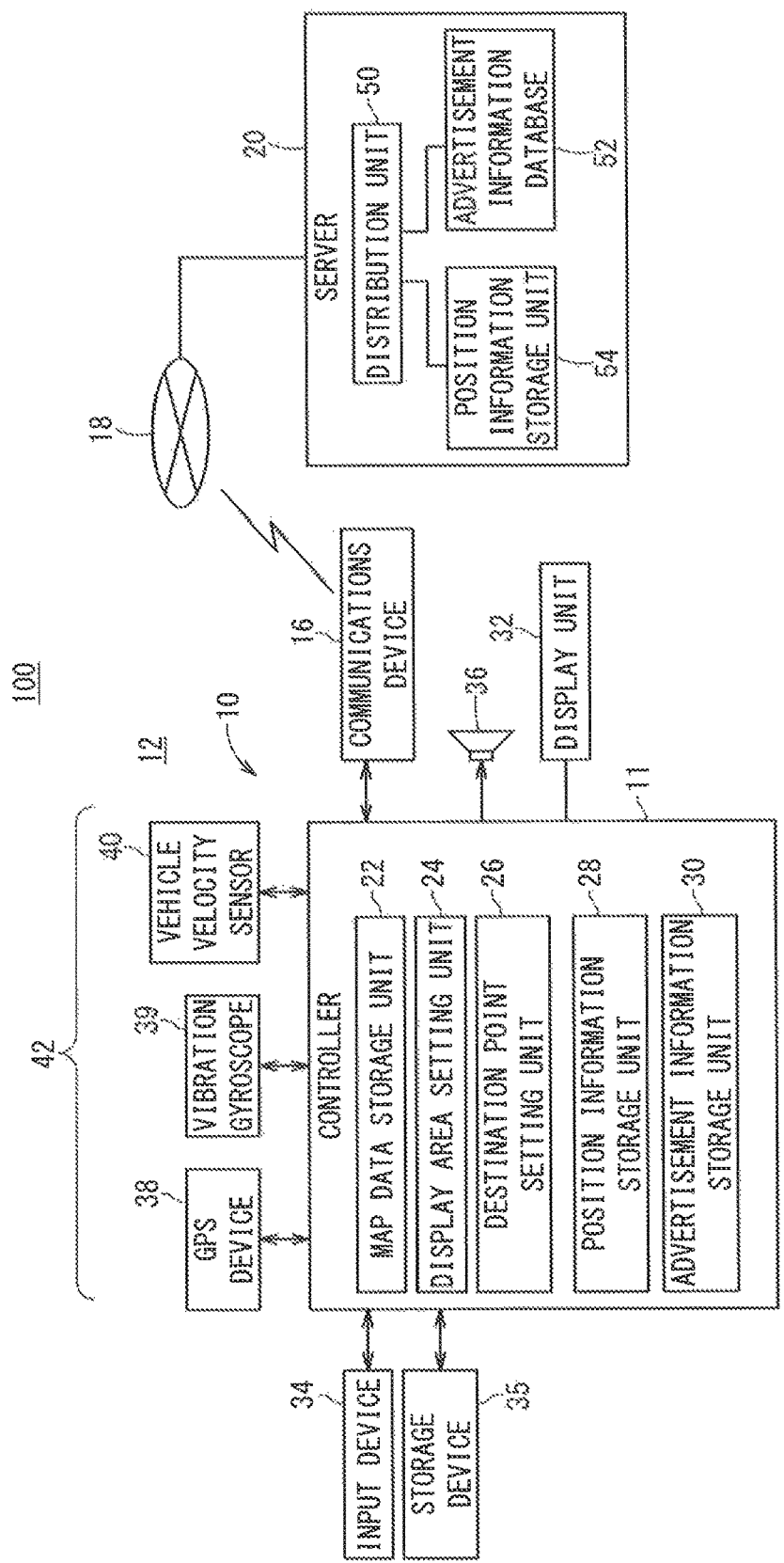
FIG. 2 is an overall block diagram showing a detailed configuration of the advertisement information distribution system shown in FIG. 1.

FIG. 2 is an overall block diagram showing a detailed configuration of the advertisement information distribution system 100 which is made up from the vehicle 12 and the server 20.

As can be understood from FIG. 2, the navigation device 10 of the vehicle 12 is equipped with a controller 11 that makes up a navigation device main body, an input device 34 connected to the controller 11, a storage device (auxiliary recording device) 35, the display unit (monitor, display) 32, a speaker (sound output device) 36, a GPS device 38, a vibration gyroscope 39, and a vehicle velocity sensor 40. The communications device 16 is connected to the controller 11.

In this instance, the display unit 32 is constituted from a liquid crystal display device or the like which is adapted to display later-described advertisement information on a map, and the input device 34 is constituted from a touch screen or the like on the display unit 32. Map data is recorded in the storage device 35.

The controller 11 is a calculating device including a microcomputer, which includes a CPU (central processing unit), a ROM (including an EEPROM), a RAM (random access memory), and a hard disk drive HDD, and apart therefrom, includes an input/output device such as a an A/D converter, a D/A converter, or the like, and a timer that serves as a timekeeping means. The CPU, by reading and executing programs recorded in the ROM, functions as various function realizing units (function realizing means), for example, a controller, a calculating unit, a processing unit, and the like.

The controller 11 comprises, as storage units thereof, and more specifically, a map data storage unit 22 in which map data including information of facilities is stored, a position information storage unit 28 in which position information of the vehicle 12 is stored, and an advertisement information storage unit 30 to which advertisement information is distributed from the server 20 and stored therein.

Furthermore, as more specific function realizing units, the controller 11 includes a display area setting unit 24 and a destination point setting unit 26.

Figure 9A:
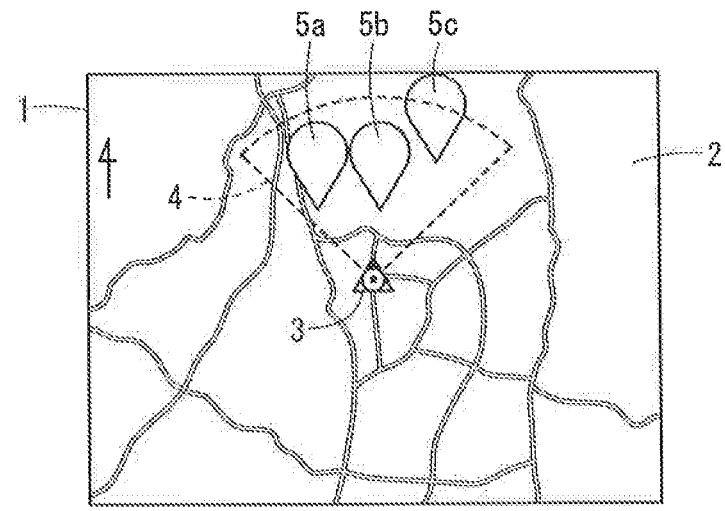
FIG. 9A is an explanatory diagram showing a condition in which, in a navigation device according to a comparative example, a plurality of advertisement information items are displayed within a fixed distribution area indicated by a fan shape in a direction of travel of a vehicle that is oriented in a northward direction.
Figure 9B:
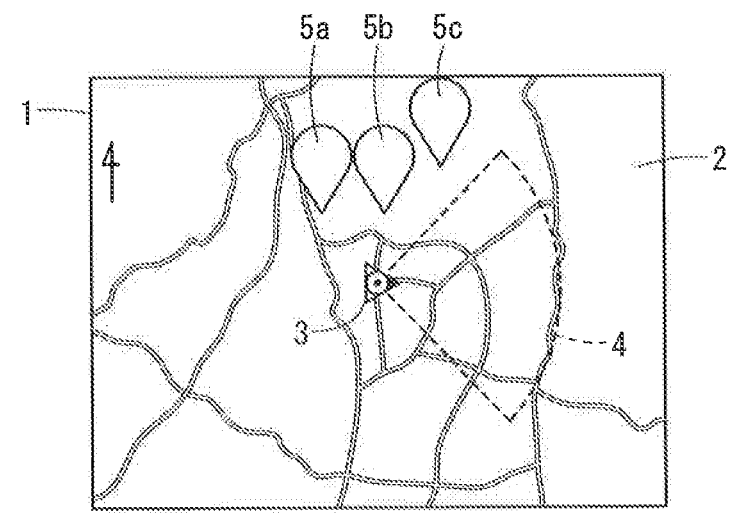
FIG. 9B is an explanatory diagram showing a condition in which the travel direction of the vehicle is changed to an eastward direction, and all of the advertisement information has fallen outside of the distribution area.
Figure 9C:
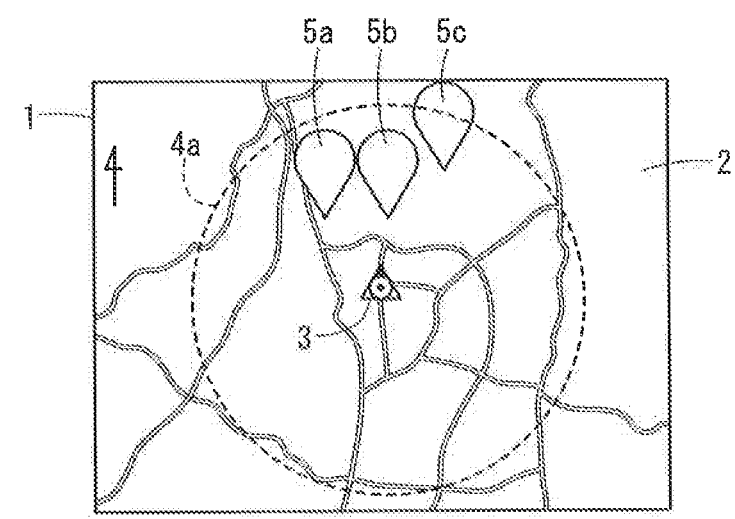
FIG. 9C is an explanatory diagram showing a condition in which the distribution area is enlarged to encompass the entire surrounding vicinity of the vehicle.

Based on the map data recorded in the map data storage unit 22, the navigation device 10 searches for a recommended route to a destination point which is set by the user through the input device 34, and guides the vehicle 12 according to the recommended route, whereby the user is guided to the destination point. Further, even in the case that a destination point is not set, the navigation device 10 displays a vehicle icon 112 (refer to FIG. 4A, etc., to be described later) by which the current location of the vehicle 12 is displayed in the form of a triangle or the like on the map that is displayed on the display unit 32. Moreover, similar to the comparative example shown in FIG. 9A, a travel direction of the vehicle 12 is indicated in the vehicle icon 112 by a side thereof that is filled in with black on the side of one vertex of the triangle.

The navigation device 10 comprises a current location detecting device (current position detecting device) 42. The current location detecting device 42 is a device that detects the current location of the host vehicle 12, and is constituted, for example, from the vibration gyroscope 39 that detects the direction in which the host vehicle 12 is headed, the vehicle velocity sensor 40 that detects the vehicle velocity, and the GPS device 38 which detects GPS signals from GPS satellites.

Based on the current location of the host vehicle 12 as detected by the current location detecting device 42, the navigation device 10 is capable of determining a route search starting point at the time of searching for a recommended route.

In the map data that is recorded in the server 20 and the map data storage unit 22 of the navigation device 10, there are included route calculation data used for calculating the recommended route, route guidance data including intersection names, road names, etc. used for guiding the host vehicle 12 to a destination point according to the recommended route, road data representing the shapes of roads, and furthermore, background data representing map shapes other than roads, such as coastlines, rivers, railroads, buildings, etc.

Further, in the map data that is recorded in the server 20 and the map data storage unit 22, there also is included facility information (also referred to as POI data) indicative of the names, positions, genre (type), and telephone numbers, etc., of the facility information (POI).

In the road data, a minimum unit representing a road section is referred to as a link. More specifically, each of the roads is constituted by a plurality of links, which are set for each of predetermined road sections. Moreover, the lengths of the road sections set by the links differ from each other, and the lengths of the links are not constant. Points where the respective links are connected to each other are referred to as nodes (intersections or dead ends, etc.), and each of the nodes includes position information (coordinate information) associated therewith. The link shapes, or stated otherwise, the shapes of the roads, are determined by position information between the nodes.

When a destination point is set by operations of the user on the input device 34 as described above, taking as a route search start point the current location detected by the current location detecting device 42, calculation of a route to the set destination point is carried out by a predetermined algorithm on the basis of the route calculation data, and a route to the destination point is determined. In addition, a map of the surrounding vicinity of the obtained recommended route is displayed on the display unit 32 together with the vehicle icon 112 indicative of the current location P0 of the vehicle 12. Further, instructions such as turning left or right are carried out appropriately according to the recommended route.

The server 20 and the vehicle 12 including the navigation device 10 are configured and operated basically in the manner described above. Next, operations thereof will be described with reference to the combined sequence chart and flowchart in order of a first exemplary (server oriented) embodiment, and a second exemplary (navigation device oriented) embodiment.

First Exemplary (Server Oriented) Embodiment

Figure 3:
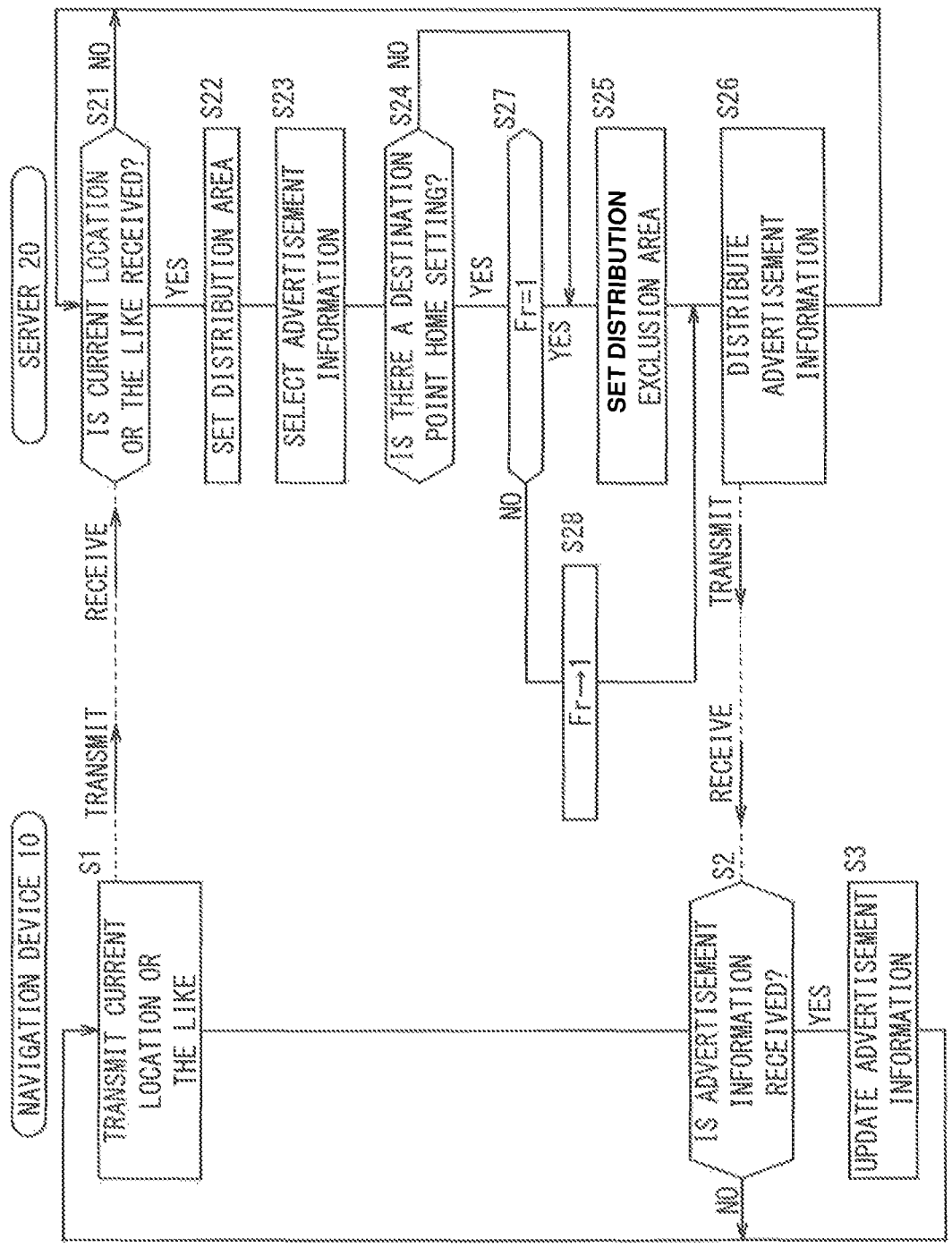
FIG. 3 is a combined sequence chart and flowchart for explaining operations of a first exemplary (server oriented) embodiment.

FIG. 3 is a combined sequence chart and flowchart for explaining operations of a first exemplary (server oriented) embodiment. The execution subject of the flowchart of the navigation device 10 is the controller 11, whereas the execution subject of the flowchart of the server 20 is the distribution unit 50. Since it is cumbersome to explain the execution subject each time, explanation thereof will be made only as necessary.

Every predetermined time during traveling and/or when positioned in the vicinity of a node, in step S1, the controller 11 of the navigation device 10 which is installed in the vehicle 12 transmits to the server 20 through the communications device 16 and the mobile communications network 18 the current location information and the like of the vehicle 12 (navigation device 10).

In this instance, the current location information and the like includes at least current location information indicative of the position of the current location P0, and current time information indicative of the current time T0, as well as travel data (also referred to as floating car data) including vehicle velocity information, and data regarding the presence or absence of settings for the destination information.

On the other hand, in step S21, the distribution unit 50 of the server 20 determines whether or not the current location information and the like of the vehicle 12 (navigation device 10) has been received. If the current information has not been received (step S21: NO), the process returns to step S21. When such information has been received (step S21: YES), then in step S22, the current location P0 and the current time T0 of the vehicle 12 are recorded in the position information storage unit 54, and an area within a predetermined range from the current location P0 is set to the distribution area R for the advertisement information $i_n$ (where n=1, 2, 3 . . . ).

Figure 4A:
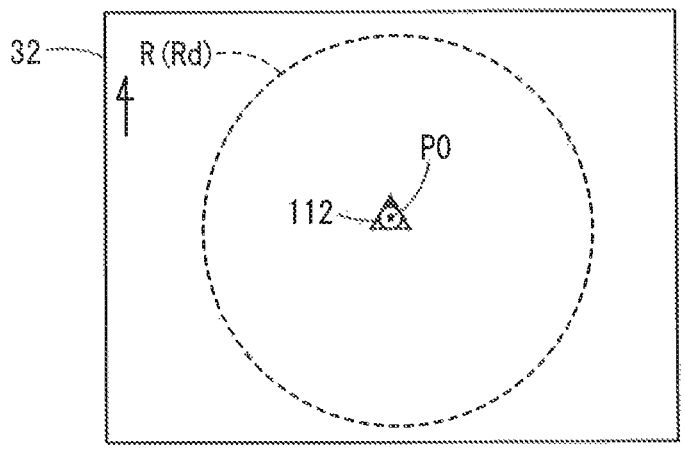
FIG. 4A is an explanatory diagram of a distribution area and a display area.

As shown in FIG. 4A, the distribution area R, for example, is set to a region within a circular shape of a predetermined radius about the current location P0. Settings for the shape and size of the distribution area R can also be modified from the navigation device 10.

Next, in step S23, the distribution unit 50 of the server 20 selects (extracts) from the advertisement information database 52 advertisement information $i_n$ relating to facilities existing within a predetermined range (distribution area R) from the current location P0 of the vehicle 12.

Next, in step S24, data regarding the presence or absence of settings for already received destination point home information are referred to, and in the case that the destination point home setting information of the vehicle 12 does not exist (step S24: NO), then in step S25, a distribution exclusion area setting process is executed.

In the distribution exclusion area setting process of step S25, in the case that the distribution unit 50 selects from the advertisement information database 52 and distributes to the navigation device 10 advertisement information $i_n$ relating to facilities within the distribution area R that exists inside of a predetermined range from the current location P0 of the navigation device 10 regardless of whether or not the destination point is set to someplace other than home, a process is carried out to exclude from the distribution area R at least a portion of a travel area in which traveling took place in a period retroactively over a predetermined time period from the current time T0 of the navigation device 10, or at least a portion of a travel area in which traveling took place in a zone retroactively over a predetermined distance from the current location P0 of the navigation device 10.

The processes from the aforementioned step S22 to step S23 and leading to step S25 after having passed through step S24: NO will be described with reference to FIGS. 4A to 4C and FIG. 5.

As shown in FIG. 4A, in step S22, the distribution area R, for example, is set to a region within a circular shape of a predetermined radius about the current location P0.

Figure 4B:
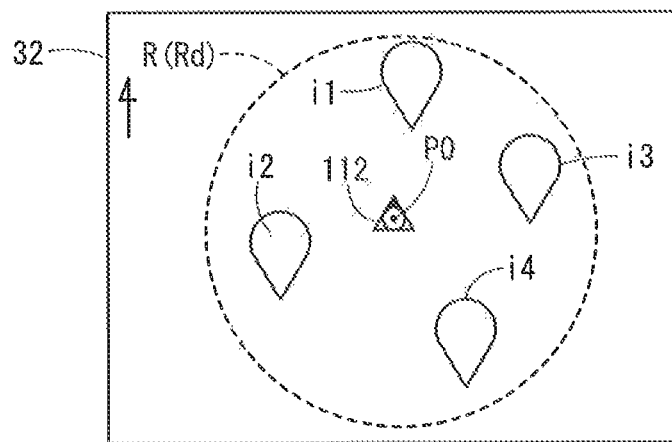
FIG. 4B is an explanatory diagram of advertisement information of facilities positioned within the distribution area (display area)

As shown in FIG. 4B, in step S23, advertisement information $i_1$, $i_2$, $i_3$, $i_4$ relating to facilities existing within the predetermined range (distribution area R) is selected (extracted) from the advertisement information database 52.

Figure 5:
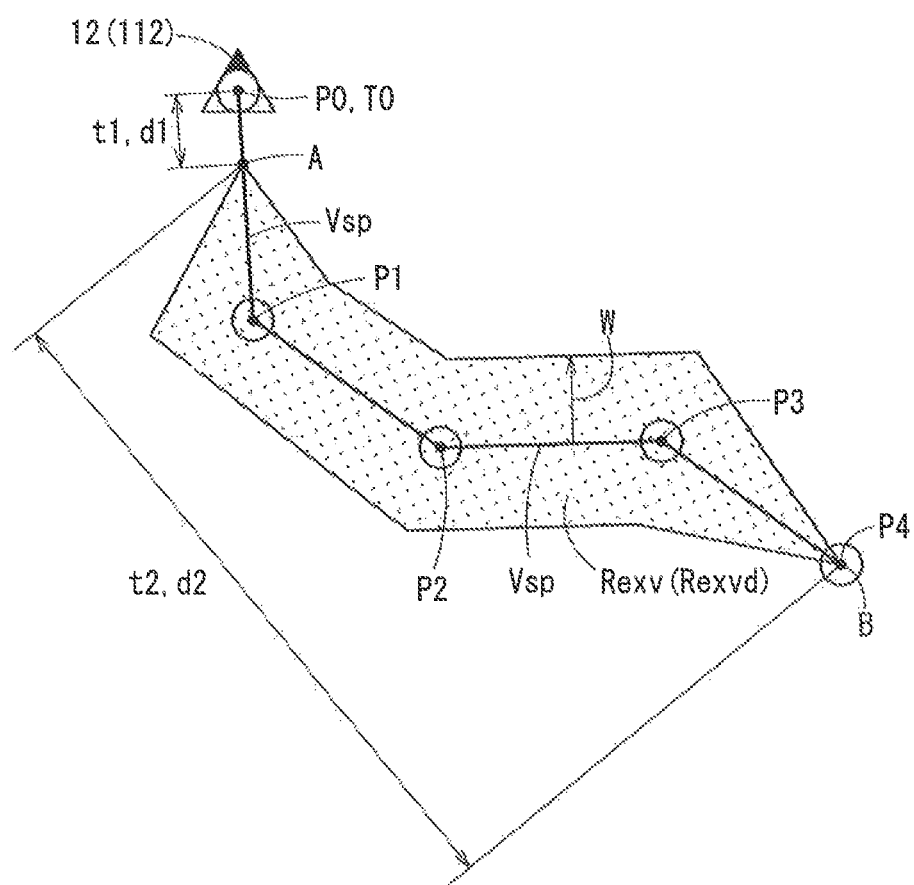
FIG. 5 is an explanatory diagram of a setting procedure for the distribution exclusion area (display exclusion area)

As shown in FIG. 5, in step S25, a distribution exclusion area Rexv indicated by the halftone dot region is set.

By an initial setting, the starting point of the distribution exclusion area Rexv is set to a point A at which the travel trajectory Vsp is traced back retroactively by a predetermined time period t1 or a predetermined distance d1 from the current location P0 of the vehicle 12. The predetermined time period t1 and the predetermined distance d1 can be modified based on a vehicle state such as the vehicle velocity or the like, or surrounding environmental information (a general road or a high speed expressway, etc.) of the vehicle 12.

The ending point of the distribution exclusion area Rexv is set to a point B at which the travel trajectory Vsp is traced back retroactively by a predetermined time period t2 (t2>t1) or a predetermined distance d2 (d2>d1) from the point A.

Setting of the starting point of the distribution exclusion area Rexv not to the current location P0 but rather to the point A which is traced back retroactively from the current location P0 is for the purpose of a user (a driver or the like) who might consider turning back if it is to a place that is nearby. Of course, it is possible to modify the setting of the starting point of the distribution exclusion area Rexv to the current location P0.

The range of the distribution exclusion Rexv area is set to a fixed width W (which is variable) with respect to the travel trajectory Vsp from point A to point B, and the range surrounded by such a width defines an exclusion range.

In FIG. 5, among the position information Pi=P0, P1, P2, P3, P4, the position information P0 represents the current location P0 at the current time T0 at which the travel data was transmitted, whereas the positions P1, P2, P3, P4 are indicative of past position information transmitted at intervals of 5 minutes, respectively. Further, in the example of FIG. 5, the point B at the ending point coincides with the position information P4.

Figure 4C:
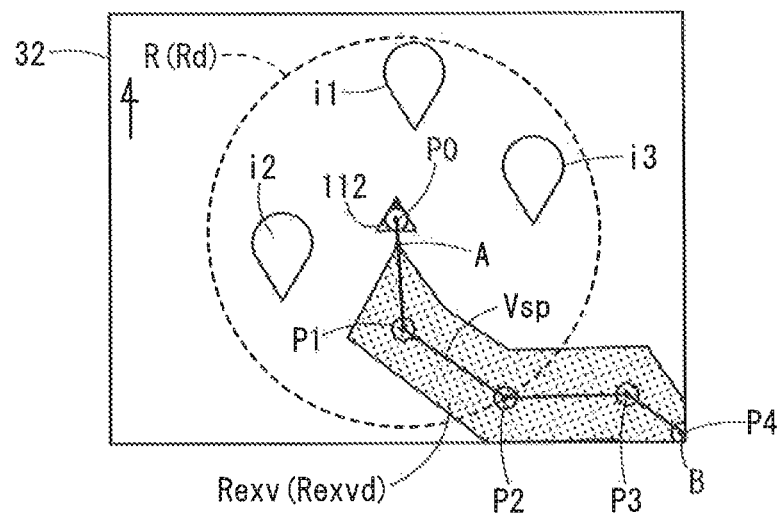
FIG. 4C is an explanatory diagram of a distribution exclusion area (display exclusion area)

When performed in this manner, as shown in FIG. 4C, in step S25, the distribution exclusion area Rexv for the advertisement information $i_n$ is set. In this case, the distribution unit 50 of the server 20 treats the advertisement information $i_4$ positioned inside of the distribution exclusion area Rexv as a distribution exclusion target.

In the aforementioned determination of step S24, in the case that the destination point home setting information of the vehicle 12 exists (step S24: YES), then in step S27, it is confirmed whether or not a one-time release flag Fr, to be described later, has been set (Fr=1).

If the one-time release flag Fr has been set (step S27: YES), the distribution exclusion area setting process of the aforementioned step S25 is executed.

If the one-time release flag Fr is reset (Fr=0) to a state of not being set (step S27: NO), then in step S28, the setting of the delivery exclusion area Rexv is temporarily canceled, and the one-time release flag Fr is set (Fr→1).

By carrying out processing in this manner, when the destination point home setting is made, the setting of the distribution exclusion area Rexv up to that point is canceled only one time, and during traveling after canceling thereof, the processes of step S24: YES→step S27: YES→step S25 are executed, whereby the distribution area Ra can be set to a point A at which the travel trajectory Vsp is traced back retroactively by a predetermined time period t1 or a predetermined distance d1 from the current location P0 of the vehicle 12, and the distribution exclusion area Rexv can be provided from the point A up to the point B. The one-time release flag Fr is reset (Fr→0) in the case that the destination point home setting is canceled.

Next, in step S26, the distribution unit 50 of the server 20 transmits the position information added advertisement information $i_n=i_1, i_2, i_3$ residing within the distribution area R, and in which the delivery exclusion area Rexv has been set as a result of the processes executed upon the chance (trigger) of having received the current location P0 in step S21, from the distribution unit 50 of the server 20 to the vehicle 12 via the mobile communications network 18.

If the controller 11 of the navigation device 10 of the vehicle 12, after having transmitted the current location information and the like in step S1, does not receive in step S2 the position information added advertisement information $i_n$ (step S2: NO), the process returns to step S1 and it is waited until a subsequent transmission of current location information and the like.

Figure 6A:
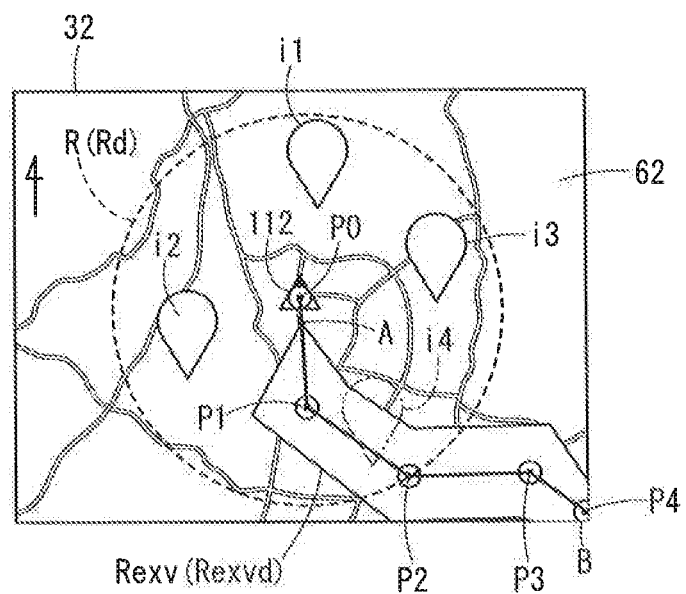
FIG. 6A is a view of a display for describing a distribution exclusion area (display exclusion area)
Figure 6B:
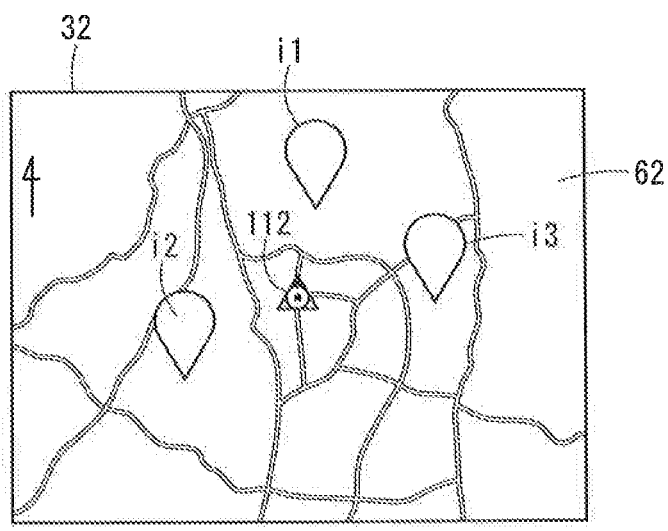
FIG. 6B is an actual view of the display.

On the other hand, if the position information added advertisement information $i_n$ (in this case, $i_n=i_1, i_2, i_3$) is received in step S2, then in step S3, as shown in the explanatory view of the display of FIG. 6A and the actual view of the display of FIG. 6B, a screen display is carried out in which the advertisement information $i_n$ is updated on the map, and then the process returns to step S1.

As can be understood from FIGS. 6A and 6B, on the display unit 32 of the navigation device 10 of the vehicle 12, a vehicle icon 112 which is displayed in the form of a triangular icon, and the advertisement information $i_1, i_2, i_3$ from which the advertisement information $i_4$ has been excluded, are displayed on a map 62.

[Summary of First Exemplary (Server Oriented) Embodiment]

As has been described above, the server 20 according to the first exemplary (server oriented) embodiment is a server 20 adapted to distribute position information added advertisement information to the navigation device 10 provided in the vehicle 12, and is equipped with the advertisement information database 52 in which the advertisement information $i_n$ is stored, and the distribution unit 50 adapted to select the advertisement information $i_n$ from the advertisement information database 52 and distribute it to the navigation device 10.

In this case, in the event that the advertisement information $i_n$, which relates to facilities existing within a distribution area R of a predetermined range from the current location P0 of the navigation device 10, is selected from the advertisement information database 52 and distributed to the navigation device 10 regardless of whether or not a destination point is set by the navigation device 10, the distribution unit 50 sets to the distribution exclusion area Rexv to be excluded from the distribution area R at least a portion (a period traced back retroactively up to the time period t2 from the point in time traced back by the time period t1 which serves as a reference time) of a travel area including a travel trajectory Vsp in which traveling took place in a period retroactively over a predetermined time period from the current time T0 of the navigation device 10 (a period traced back retroactively by the time period t1+the time period t2 from the current time T0 as a reference time), or the entire part thereof (the period traced back retroactively up to the time period t1+the time period t2 with the time T0 serving as the reference time).

Alternatively, the distribution unit 50 sets to a distribution exclusion area Rexv to be excluded from the distribution area R at least a portion (a zone traced back retroactively up to the distance d2 from the position traced back by the distance d1 which serves as a reference position) of a travel area including a travel trajectory Vsp in which traveling took place in a zone retroactively over a predetermined distance from the current location P0 of the navigation device 10 (a zone traced back retroactively by the distance d1+the distance d2 from the current location P0 as a reference position), or the entire part thereof (the zone traced back retroactively by the distance d1+the distance d2 with the current location P0 serving as the reference position).

In this manner, in the event that advertisement information $i_n$ relating to facilities existing in the vicinity of the current location P0 of the navigation device 10 being used by a user such as a driver or the like is distributed from the distribution unit 50 of the server 20, at least a portion of an area of a travel area which has recently been traversed by the user (and the navigation device 10) is excluded from a distribution target of the advertisement information $i_n$. Therefore, it becomes unnecessary to distribute advertisement information $i_4$ of a facility in a location where it would be necessary to turn back from the current location P0, it is possible to improve the accuracy of the distribution area R for the advertisement information $i_n$, and distribution of unnecessary advertisement information $i_4$ can be dispensed with.

In this case, as the at least a portion of the travel area that was set to the distribution exclusion area Rexv and in which traveling took place in a period retroactively over the predetermined time period (time period t1+time period t2) from the current time T0 of the navigation device 10, the distribution unit 50 may set in the travel area as a starting point A, a first point in which the first predetermined time period t1 is traced back retroactively from the current time T0, and as an ending point B, a second point in which the second predetermined time period t2 is traced back retroactively from a passage time of the first point (starting point A). Alternatively, as the at least a portion of the travel area that was set to the distribution exclusion area Rexv and in which traveling took place in a zone retroactively over the predetermined distance (distance d1+distance d2) from the current location P0 of the navigation device 10, the distribution unit 50 may set in the travel area as a starting point A, a third point in which the first predetermined distance d1 is traced back retroactively from the current location P0, and as an ending point B, a fourth point in which the second predetermined distance d2 is traced back retroactively from a passage position (starting point A) of the third point (starting point A). In this manner, within the travel area that has recently been traversed, by not excluding distribution to a travel area up to the first point A in which the first predetermined time period t1 is traced back retroactively from the current time T0, or a travel area up to the third point A in which the first predetermined distance d1 is traced back retroactively from the current location P0, useful advertisement information can be delivered with respect to a user (user of the navigation device 10) who might consider turning back if it is to a place that is nearby.

In the event it is detected from the navigation device 10 that the navigation destination point (destination point for navigation) has been set to home (step S24: YES), the distribution unit 50 may cancel the setting of the distribution exclusion area Rexv only one time, and may change the setting of the distribution exclusion area Rexv to the distribution area R. If the user is returning home, timely advertisement information can be displayed in consideration of a user who thinks it might be acceptable to stop by a facility that is transmitting advertisement information. In this case, it should be noted that, after setting of the distribution exclusion area Rexv has been canceled one time (step S24: YES→step S27: NO→step S28), even if there is a destination point home setting, setting of the distribution exclusion area (step S25) is resumed (step S24: YES→step S27: YES→step S25).

[Modification of First Exemplary (Server Oriented) Embodiment]

Figure 7:
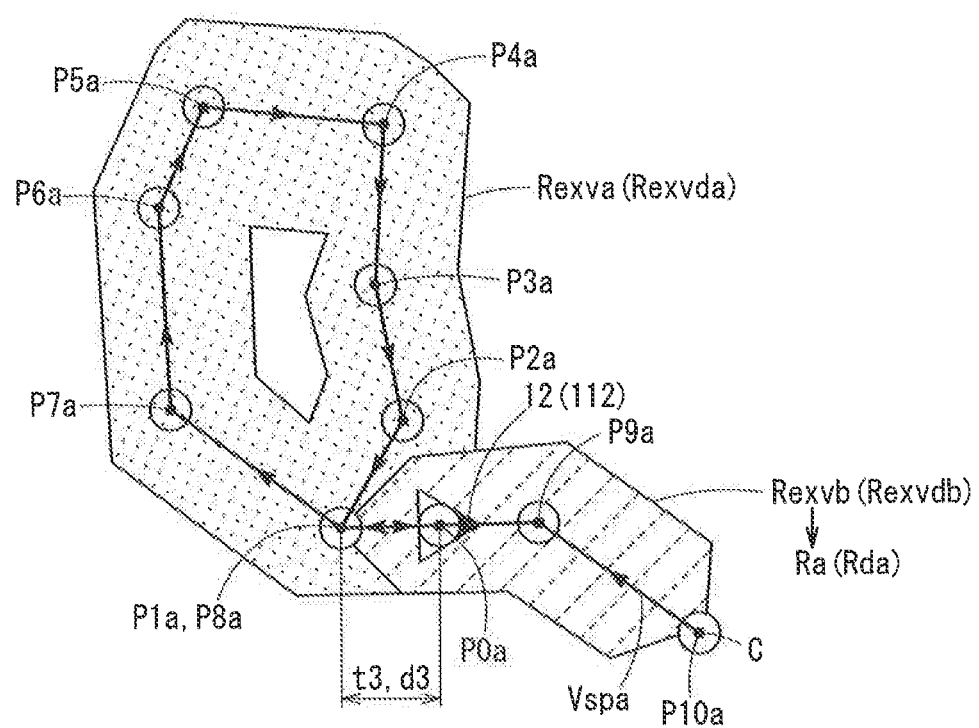
FIG. 7 is an explanatory diagram of the cancellation of a setting for the distribution exclusion area (display exclusion area) according to a modification of the first exemplary embodiment.

With reference to FIG. 7, a description will be given concerning a modification of the first exemplary embodiment.

The travel trajectory Vspa is formed as a trajectory that is traced back retroactively from a current location P0a, through the position information P1a, P2a, P3a, P4a, P5a, P6a, P7a, P8a (which is at the same position as the position information P1a) and P9a, and up to the position information P10a (point C). In this case, according to the first exemplary embodiment, the region indicated by halftone dots and the region indicated by hatching are set respectively to a distribution exclusion area Rexva and a distribution exclusion area Rexvb.

In contrast thereto, according to the modification of the first exemplary embodiment, as a process immediately after the distribution exclusion area setting process in step S25, in the event it is determined that the vehicle 12 (navigation device 10) is traveling in such a manner that a portion of the travel trajectory Vspa thereof within the travel area that was set to the distribution exclusion areas Rexva, Rexvb overlaps by a predetermined time period t3 or a predetermined distance d3, the distribution unit 50 of the server 20 cancels the setting of the distribution exclusion area Rexvb shown in hatching of the travel area in which traveling takes place in an overlapping manner, and sets the distribution exclusion area Rexvb to the distribution area Ra. In addition, in the advertisement information distribution process of step S26, transmission to the navigation device 10 also is carried out together with the advertisement information $i_n$ existing inside the distribution area Ra from which distribution was once excluded.

By performing the control in this manner, on the map screen of the display unit 32 of the navigation device 10, advertisement information $i_n$ of the surrounding vicinity of the vehicle 12 can accurately be displayed.

Moreover, in the above-described modification of the first exemplary embodiment, as an example, a case was described in which traveling (proceeding) along the same link takes place in a reverse direction. However, canceling of the distribution exclusion area Rexvb and setting it to the distribution area Ra may be carried out in the same manner for a case in which a median strip exists on the road and links are formed by two double lines, and also for a case in which traveling (proceeding) takes place along one link of a double line, and thereafter traveling (proceeding) takes place along another link of the pair. Further, canceling of the distribution exclusion area Rexvb and setting it to the distribution area Ra may be carried out in the same manner for a case in which turning is performed along the same link (i.e., a case in which traveling takes place in one direction along a link that is constituted in the form of a ring).

Figure 8:
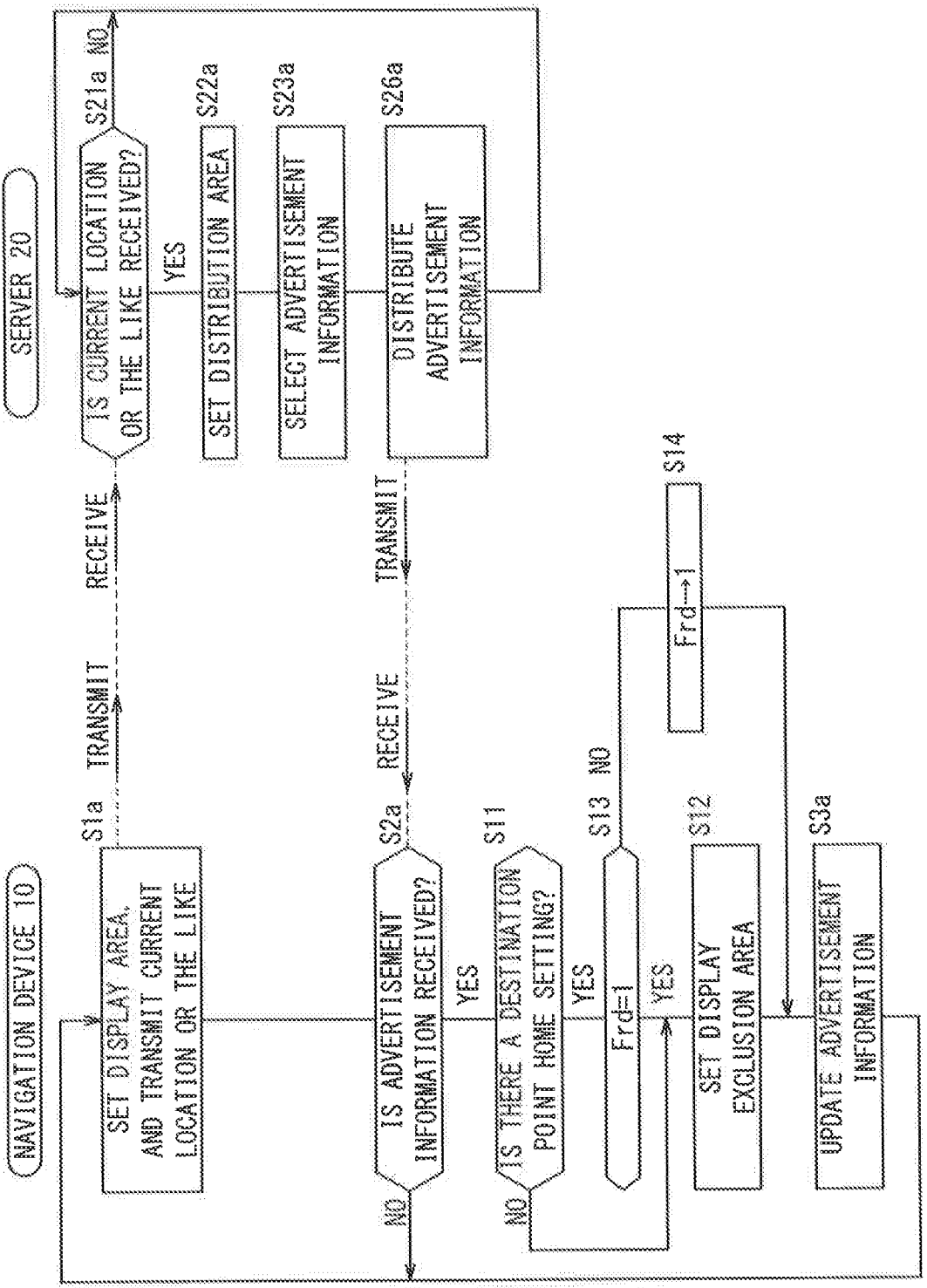
FIG. 8 is a combined sequence chart and flowchart for explaining operations of a second exemplary (navigation device oriented) embodiment.

Next, a description will be presented with reference to the combined sequence chart and flowchart shown in FIG. 8 concerning operations of a second exemplary (navigation device oriented) embodiment.

Second Exemplary Embodiment (Navigation Device Oriented Operations)

According to the second exemplary embodiment, instead of the distribution unit 50 performing the setting processes of the distribution exclusion area that were executed in step S25, etc., the configuration is modified so that equivalent processes are individually executed primarily by the display area setting unit 24 of the controller 11 on the side of the navigation device 10. Therefore, only a brief description of such processes will be presented. Processes which are the same or correspond to the processes shown in FIG. 3 are denoted by the same step numbers with the suffix "a" appended thereto, and the description of such processes is partially omitted.

In step S1a, the current location information and the like (also including information of a display area Rd, as will be described later) of the vehicle 12 (navigation device 10) is transmitted to the server 20 through the communications device 16 and the mobile communications network 18.

In step S21a, the distribution unit 50 of the server 20 determines whether or not the current location information and the like of the vehicle 12 (navigation device 10) have been received, and if such information has been received (step S21a: YES), then in step S22a, the current location P0 of the vehicle 12 and the current time T0 are recorded in the position information storage unit 54, and an area within a predetermined range from the current location P0 corresponding to the display area Rd is set to the distribution area R of the advertisement information $i_n$ (where n=1, 2, ... ).

The distribution area R corresponds to setting of a display area Rd for the advertisement information $i_n$ on the side of the navigation device 10, and is changed correspondingly to a process of changing the settings for the display area Rd of the navigation device 10, which is included in the process of step S1a.

As shown in FIG. 4A, by the display area setting unit 24 of the navigation device 10, the display area Rd, for example, is set to a region within a circular shape of a predetermined radius about the current location P0. It is a matter of course that settings for the shape and size of the display area Rd can be modified by the display area setting unit 24 of the navigation device 10.

Next, in step S23a, advertisement information $i_n$ relating to facilities existing within a predetermined range (display area Rd, distribution area R) are selected (extracted) from the advertisement information database 52 (see FIG. 4B).

Then, a distribution process of the advertisement information $i_n$ selected in step S26a (the advertisement information $i_n=i_1, i_2, i_3, i_4$ shown in FIG. 4B) is carried out. More specifically, transmission thereof is performed from the distribution unit 50 of the server 20 to the vehicle 12 through the mobile communications network 18.

If the controller 11 of the navigation device 10 of the vehicle 12, after having transmitted the current location information and the like in step S1a, does not receive in step S2a the position information added advertisement information $i_n$ (step S2a: NO), the process returns to step S1a and it is waited until a subsequent transmission of current location information.

On the other hand, if the position information added advertisement information $i_n$ (in $=i_1, i_2, i_3, i_4$) is received in step S2a, then in step S11 and step S12, a process to confirm presence or absence of the destination point home setting and a process to set the display exclusion area, which correspond to the aforementioned processes of step S24 and step S25 performed by the distribution unit 50, are carried out.

In step S11, the presence or absence of settings for the destination point home information is confirmed by the destination point setting unit 26, and in the case that the destination point home setting information does not exist (step S11: NO), then in step S12, a display exclusion area setting process is executed.

In the display exclusion area setting process of step S12, from among the advertisement information $i_n$ (see FIG. 4B) relating to facilities within the display area Rd that exists inside of a predetermined range from the current location P0 of the navigation device 10, the display area setting unit 24 of the controller 11 carries out a process to exclude from the display area Rd at least a portion of a travel area in which traveling took place in a period retroactively over a predetermined time period from the current time T0 of the navigation device 10, or at least a portion of a travel area in which traveling took place in a zone retroactively over a predetermined distance from the current location P0 of the navigation device 10.

In this case, as explained with reference to FIG. 5, a display exclusion area Rexvd indicated by the halftone dot region is set.

By an initial setting, the starting point of the display exclusion area Rexvd is set to a point A at which the travel trajectory Vsp is traced back retroactively by a predetermined time period t1 or a predetermined distance d1 from the current location P0. The ending point of the display exclusion area Rexvd is set to a point B at which the travel trajectory Vsp is traced back retroactively by a predetermined time period t2 (t2>t1) or a predetermined distance d2 (d2>d1) from the point A.

Setting of the starting point of the display exclusion area Rexvd not to the current location P0 but rather to the point A which is traced back retroactively from the current location P0 is for the purpose of a user (a driver or the like) who might consider turning back if it is to a place that is nearby. Of course, it is possible to modify the setting of the starting point of the display exclusion area Rexvd to the current location P0.

The range of the display exclusion area Rexvd is set to a fixed width W (which is variable) with respect to the travel trajectory Vsp from point A to point B, and the range surrounded by such a width defines an exclusion range.

In FIG. 5, among the position information Pi=P0, P1, P2, P3, P4, the position information P0 represents the current location P0 at the current time T0 at which the travel data was transmitted, whereas the positions P1, P2, P3, P4 are indicative of past position information transmitted at intervals of 5 minutes, respectively. Further, in the example of FIG. 5, the point B at the ending point coincides with the position information P4.

When performed in this manner, as shown in FIG. 4C, in step S12, the display exclusion area Rexvd for the advertisement information $i_n$ is set. In this case, the controller 11 excludes the advertisement information $i_4$ positioned inside of the display exclusion area Rexvd and which was distributed from the server 20.

In the aforementioned determination of step S11, in the case that the destination point home setting information of the vehicle 12 exists (step S11: YES), then in step S13, it is confirmed whether or not a one-time release flag Frd, to be described later, has been set (Frd=1).

If the one-time release flag Frd has been set (step S13: YES), the display exclusion area setting process of the aforementioned step S12 is executed.

If the one-time release flag Frd is reset (Frd=0) to a state of not being set (step S13: NO), then in step S14, the setting of the display exclusion area Rexvd is temporarily canceled, and the one-time release flag Frd is set (Frd→1).

By carrying out processing in this manner, when the destination point home setting is made, the setting of the display exclusion area Rexvd up to that point is canceled one time only, and during traveling after canceling thereof, the processes of step S11: YES→step S13: YES→step S12 are executed, whereby the display area Rd can be set to a point A at which the travel trajectory Vsp is traced back retroactively by a predetermined time period t1 or a predetermined distance d1 from the current location P0 of the vehicle 12, and the display exclusion area Rexvd can be provided from the point A up to the point B. The one-time release flag Frd is reset (Frd→0) in the case that the destination point home setting is canceled.

Next, in step S3a, as shown in the explanatory view of the display of FIG. 6A and the actual view of the display of FIG. 6B, a screen display is carried out in which the advertisement information $i_n$ is updated on the map, and then the process returns to step S1a.

As can be understood from FIGS. 6A and 6B, on the display unit 32 of the navigation device 10 of the vehicle 12, a vehicle icon 112 by which the vehicle 12 is displayed in the form of an isosceles triangle, and the advertisement information $i_1$, $i_2$, $i_3$ from which the advertisement information $i_4$ has been excluded, are displayed on the map 62.

[Summary of Second Exemplary (Navigation Device Oriented) Embodiment]

As has been described above, the navigation device 10 according to the above-described second exemplary (navigation device oriented) embodiment is a navigation device 10 in a vehicle 12 and adapted to receive position information added advertisement information $i_n$ from the server 20, and is equipped with the display unit 32 adapted to display a map 62 of a surrounding area including the position of the navigation device 10, and the display area setting unit 24 which, on the basis of position information from the received advertisement information $i_n$ (position information of the advertisement information $i_n$), and travel trajectory information Vsp of the vehicle 12 which is a host vehicle and that is stored in the position information storage unit 28, is adapted to set the display area Rd for the advertisement information $i_n$ in order to display the advertisement information $i_n$ in a superimposed manner on the map 62 of the display unit 32.

In this case, in the event that the display area Rd for the advertisement information $i_n$, which relates to facilities existing within a predetermined range from the current location P0 of the navigation device 10, is set from the received advertisement information $i_n$ ($i_n$=$i_1$, $i_2$, $i_3$, $i_4$), the display area setting unit 24 sets to the display exclusion area Rexvd to be excluded from the display area Rd at least a portion (a period traced back retroactively up to the time period t2 from the point in time traced back by the time period t1 which serves as a reference time) of a travel area including a travel trajectory Vsp in which traveling took place in a period retroactively over a predetermined time period from the current time T0 of the navigation device 10 (a period traced back retroactively by the time period t1+the time period t2 from the current time T0 as a reference time), or the entire part thereof (the period traced back retroactively up to the time period t1+the time period t2 with the time T0 serving as the reference time).

Alternatively, the display area setting unit 24 sets to the display exclusion area Rexvd to be excluded from the display area Rd at least a portion (a zone traced back retroactively up to the distance d2 from the position traced back by the distance d1 which serves as a reference position) of a travel area including a travel trajectory Vsp in which traveling took place in a zone retroactively over a predetermined distance from the current location P0 of the navigation device 10 (a zone traced back retroactively by the distance d1+the distance d2 from the current location P0 as a reference position), or the entire part thereof (the zone traced back retroactively by the distance d1+the distance d2 with the current location P0 serving as the reference position).

In this manner, in the event that advertisement information $i_n$ relating to facilities existing in the vicinity of the current location P0 of the navigation device 10 being used by a user such as a driver or the like is displayed, the controller 11 of the navigation device 10 excludes from a display target of the advertisement information $i_n$ at least a portion of an area of a travel area which has recently been traversed by the user (and the navigation device 10). Therefore, it becomes unnecessary to display advertisement information $i_4$ of a facility in a location where it would be necessary to turn back from the current location P0, it is possible to improve the accuracy of the display area Rd for the advertisement information $i_n$, and display of unnecessary advertisement information $i_4$ can be dispensed with.

In this case, as the at least a portion of the travel area that was set to the display exclusion area Rexvd and in which traveling took place in a period retroactively over the predetermined time period (time period t1+time period t2) from the current time T0 of the navigation device 10, the display area setting unit 24 may set in the travel area as a starting point A, a first point in which the first predetermined time period t1 is traced back retroactively from the current time T0, and as an ending point B, a second point in which the second predetermined time period t2 is traced back retroactively from a passage time of the first point (starting point A). Alternatively, as the at least a portion of the travel area that was set to the display exclusion area Rexvd and in which traveling took place in a zone retroactively over the predetermined distance (distance d1+distance d2) from the current location P0 of the navigation device 10, the display area setting unit 24 may set in the travel area as a starting point A, a third point in which the first predetermined distance d1 is traced back retroactively from the current location P0, and as an ending point B, a fourth point in which the second predetermined distance d2 is traced back retroactively from a passage position (starting point A) of the third point (starting point A). In this manner, within the travel area that has recently been traversed, by not excluding from the display area Rd for the advertisement information $i_n$ a travel area up to the first point A in which the first predetermined time period t1 is traced back retroactively from the current time T0, or a travel area up to the third point A in which the first predetermined distance d1 is traced back retroactively from the current location P0, useful advertisement information can be displayed (distributed) with respect to a user (user of the navigation device 10) who might consider turning back if it is to a place that is nearby.

In the event it is detected from the destination point setting unit 26 that the navigation destination point has been set to home (step S11: YES), the display area setting unit 24 may cancel the setting of the display exclusion area Rexvd only one time, and may change the setting of the display exclusion area Rexvd to the display area Rd. If the user is returning home, timely advertisement information $i_n$ can be displayed in consideration of a user who thinks it might be acceptable to stop by a facility that is transmitting the advertisement information $i_n$. In this case, it should be noted that, after setting of the display exclusion area Rexvd has been canceled one time (step S13), even if there is a destination point home setting, setting of the display exclusion area Rexvd (step S12) is resumed (step S11: YES→step S13: YES→step S12).

[Modification of Second Exemplary (Navigation Device Oriented) Embodiment]

In the same manner as the modification of the first exemplary embodiment described with reference to FIG. 7, the travel trajectory Vspa is formed as a trajectory that is traced back retroactively from a current location P0a, through the position information P1a, P2a, P3a, P4a, P5a, P6a, P7a, P8a (which is at the same position as the position information P1a) and P9a, and up to the position information P10a (point C). In this case, the region indicated by halftone dots and the region indicated by hatching are set respectively to a display exclusion area Rexvda and a display exclusion area Rexvdb in the second exemplary embodiment.

In contrast thereto, according to the modification of the second exemplary embodiment, as a process immediately after the display exclusion area setting process in step S12, in the event it is determined that the vehicle 12 (navigation device 10) is traveling in such a manner that a portion of the travel trajectory Vspa thereof within the travel area that was set to the display exclusion areas Rexvda, Rexvdb overlaps by a predetermined time period t3 or a predetermined distance d3, the display area setting unit 24 cancels the setting of the display exclusion area Rexvdb shown in hatching of the travel area in which traveling takes place in an overlapping manner, and sets the display exclusion area Rexvdb to the display area Rda. In addition, in the advertisement information distribution process of step S3a, the advertisement information $i_n$ existing inside the display area Rda from which display thereof was once excluded is displayed on the display unit 32.

Moreover, in the above-described modification of the second exemplary embodiment, as an example, a case was described in which traveling (proceeding) along the same link takes place in a reverse direction. However, canceling of the display exclusion area Rexvdb and setting it to the display area Rda may be carried out in the same manner for a case in which a median strip exists on the road and links are formed by two double lines, and also for a case in which traveling (proceeding) takes place along one link constituting part of a double line, and thereafter traveling (proceeding) takes place along another link of the pair. Further, canceling of the display exclusion area Rexvdb and setting it to the display area Rda may be carried out in the same manner for a case in which turning is performed along the same link (i.e., a case in which traveling takes place in one direction along a link that is constituted in the form of a ring).

By performing the control in this manner, on the map screen of the display unit 32 of the navigation device 10, advertisement information $i_n$ of the surrounding vicinity of the vehicle 12 can accurately be displayed.

[Description of Method of Setting Distribution Exclusion Area in Advertisement Information Distribution System]

The method of setting the distribution exclusion area Rexv takes place in the advertisement information distribution system 100, which is made up from the navigation device 10 in the vehicle 12, and the server 20 that distributes the position information added advertisement information $i_n$ to the navigation device 10, and in which the server 20 is equipped with the advertisement information database 52 in which the advertisement information $i_n$ is stored, and the distribution unit 50 adapted to select the advertisement information $i_n$ from the advertisement information database 52 and distribute it to the navigation device 10.

In the setting method, the distribution unit 50 includes a distribution step (step S23, step S25, step S26) of selecting from the advertisement information database 52 and distributing to the navigation device 10 the advertisement information $i_n$ relating to facilities in the distribution area R of a predetermined range from the current position P0 of the navigation device 10, and in the distribution step, there is set to the distribution exclusion area Rexv to be excluded from the distribution area R at least a portion (a period traced back retroactively up to the time period t2 from the point in time traced back by the time period t1 which serves as a reference time) of a travel area including a travel trajectory Vsp in which traveling took place in a period retroactively over a predetermined time period from the current time T0 of the navigation device 10 (a period traced back retroactively by the time period t1+the time period t2 from the current time T0 as a reference time), or the entire part thereof (the period traced back retroactively up to the time period t1+the time period t2 with the time T0 serving as the reference time).

Alternatively, the distribution unit 50 sets to a distribution exclusion area Rexv to be excluded from the distribution area R at least a portion (a zone traced back retroactively up to the distance d2 from the position traced back by the distance d1 which serves as a reference position) of a travel area including a travel trajectory Vsp in which traveling took place in a zone retroactively over a predetermined distance from the current location P0 of the navigation device 10 (a zone traced back retroactively by the distance d1+the distance d2 from the current location P0 as a reference position), or the entire part thereof (the zone traced back retroactively by the distance d1+the distance d2 with the current location P0 serving as the reference position).

In this manner, in the case of distributing advertisement information $i_n$ relating to facilities existing in the vicinity of the current location P0 of the navigation device 10 being used by a user such as a driver or the like of the vehicle 12, at least a portion of an area of a travel area which has recently been traversed by the user (and the navigation device 10) is excluded from a distribution target of the advertisement information $i_n$. Therefore, it becomes unnecessary to distribute advertisement information $i_4$ of a facility in a location where it would be necessary to turn back from the current location P0, it is possible to improve the accuracy of the distribution area R for the advertisement information $i_n$, and distribution of unnecessary advertisement information $i_4$ can be dispensed with.

The present invention is not limited to the embodiments described above, and it is a matter of course that various additional or modified configurations could be adopted therein based on the content set forth in the present specification. For example, the present invention may be applied to an advertisement information distribution system that distributes advertisement information $i_n$ relating to facilities in the vicinity of the current location P0 of a mobile terminal 44 in which a navigation device is incorporated, which is used by users other than a driver of a vehicle 12, such as pedestrians or the like.

The invention claimed is:

1. A server which distributes advertisement information to a navigation device in a vehicle, comprising:
 a database which stores the advertisement information; and
 a distribution unit which selects the advertisement information from the database and distributes the advertisement information to the navigation device;
 wherein the advertisement information which the distribution unit selects from the database relates to facilities existing within a distribution area of a predetermined range from a current location of the navigation device and the distribution unit modifies the selected advertisement information which is distributed to the navigation device by setting a distribution exclusion area within the distribution area, and excluding any of the advertising information in the distribution exclusion area, wherein the distribution exclusion area includes at least a portion of a travel area through which the vehicle has traveled during a predetermined time period prior to a current time of the navigation device, or at least a portion of a travel area through which the vehicle has traveled over a predetermined distance prior to arriving at the current location of the navigation device, and wherein either the distribution unit sets the at least a portion of the travel area through which the vehicle has traveled during the predetermined time period that was set to the distribution exclusion area by setting in the travel area as a starting point, a first point in which travel of the vehicle during a first predetermined time period prior to the current time is traced back, and as an ending point, a second point in which prior travel of the vehicle during a second predetermined time period is traced back from the first point; or the distribution unit sets the at least a portion of the travel area through which the vehicle has traveled over the predetermined distance to the distribution exclusion area by setting in the travel area as a starting point, a third point in which a first predetermined distance in prior travel of the vehicle is traced back from the current location, and as an ending point, a fourth point in which a second predetermined distance in prior travel of the vehicle is traced back from the third point.

2. The server according to claim 1, wherein, when it is detected from the navigation device that a destination point for navigation has been set to home, the distribution unit cancels setting of the distribution exclusion area, and changes the setting of the distribution exclusion area to the distribution area.

3. The server according to claim 1, wherein, when it is determined that the vehicle is traveling in a manner that a portion of a travel trajectory thereof within the travel area that was set to the distribution exclusion area overlaps by a predetermined time or a predetermined distance, the distribution unit cancels setting of the distribution exclusion area of the travel area in which traveling takes place in an overlapping manner, and changes the setting of the distribution exclusion area to the distribution area.

4. A navigation device in a vehicle and which receives advertisement information distributed from a server, comprising:

a display unit which displays a map of a surrounding area including a current position of the navigation device; and a display area setting unit which sets, on a basis of travel trajectory information of the vehicle, a display area for the advertisement information so that the advertisement information distributed from the server is displayed in a superimposed manner on a map of the display unit;

wherein the advertising information relates to facilities existing within a predetermined range from a current location of the navigation device, and the display area setting unit sets a display exclusion area to be excluded from the display area for the advertisement information, the display exclusion area including at least a portion of a travel area through which the vehicle has traveled during a predetermined time period prior to a current time of the navigation device, or at least a portion of a travel area through which the vehicle has traveled over a predetermined distance prior to arriving at the current location of the navigation device, and wherein either the display area setting unit sets the at least a portion of the travel area of the display exclusion area by setting in the travel area as a starting point, a first point in which travel of the vehicle during a first predetermined time period prior to the current time is traced back, and as an ending point, a second point in which travel of the vehicle during a second predetermined time period is traced back from the first point; or the display area setting unit sets the at least a portion of the travel area of the display exclusion area by setting in the travel area as a starting point, a third point in which a first predetermined distance in prior travel of the vehicle is traced back from the current location, and as an ending point, a fourth point in which a second predetermined distance in prior travel of the vehicle is traced back from the third point.

5. The navigation device according to claim 4, further comprising a destination point setting unit which sets a destination point;

wherein, when it is detected from the destination point setting unit that the destination point for navigation has been set to home, the display area setting unit cancels setting of the display exclusion area, and changes the setting of the display exclusion area to the display area.

6. The navigation device according to claim 4, wherein, when the navigation device determines that the vehicle is traveling in a manner that a portion of a travel trajectory thereof within the travel area that was set in the display exclusion area overlaps by a predetermined time or a predetermined distance, the display area setting unit cancels setting of the display exclusion area of the travel area in which traveling takes place in an overlapping manner, and changes the setting of the display exclusion area to the display area.

7. A method of setting a distribution exclusion area in an advertisement information distribution system including a navigation device in a vehicle and a server which distributes advertisement information to the navigation device, and the server comprises a database which stores the advertisement information and a distribution unit which selects the advertisement information from the database and distributes the advertisement information to the navigation device, the method comprising:

a reception step in which the server receives a current location of the navigation device; and a distribution step in which the distribution unit selects from the database the advertisement information which relates to facilities existing within a distribution area of a predetermined range from the current location of the navigation device, and distributes the advertisement information to the navigation device;

wherein, in the distribution step, there is set a distribution exclusion area to be excluded from the distribution area, the distribution exclusion area including at least a portion of a travel area through which the vehicle has traveled during a predetermined time period prior to a current time of the navigation device, or at least a portion of a travel area through which the vehicle has traveled over a predetermined distance prior to arriving at the current location of the navigation device, and wherein in the distribution step either the distribution unit sets the at least a portion of the travel area through which the vehicle has traveled during the predetermined time period to the distribution exclusion area by setting in the travel area as a starting point, a first point in which travel of the vehicle during a first predetermined time period prior to the current time is traced back, and as an ending point, a second point in which prior travel of the vehicle during a second predetermined time period is traced back from the first point; or the distribution unit sets the at least a portion of the travel area through which the vehicle has traveled over the predetermined distance to the distribution exclusion area by setting in the travel area as a starting point, a third point in which a first predetermined distance in prior travel of the vehicle is traced back from the current location, and as an ending point, a fourth point in which a second predetermined distance in prior travel of the vehicle is traced back from the third point.

8. The method according to claim 7, wherein, when it is detected from the navigation device that a destination point for navigation has been set to home, in the distribution step the distribution unit cancels setting of the distribution exclusion area, and changes the setting of the distribution exclusion area to the distribution area.

9. The method according to claim 7, wherein, when it is determined that the vehicle is traveling in a manner that a portion of a travel trajectory thereof within the travel area that was set to the distribution exclusion area overlaps by a predetermined time or a predetermined distance, in the distribution step the distribution unit cancels setting of the distribution exclusion area of the travel area in which traveling takes place in an overlapping manner, and changes the setting of the distribution exclusion area to the distribution area.

* * * * *